(12) United States Patent
Etoh et al.

(10) Patent No.: US 7,508,631 B2
(45) Date of Patent: Mar. 24, 2009

(54) SILICON-MADE MAGNETIC HEAD SLIDER

(75) Inventors: Kimitoshi Etoh, Kanagawa (JP);
Masayuki Kurita, Ibaraki (JP);
Tokuyama Mikio, Ibaraki (JP);
Shiramatsu Toshiya, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 400 days.

(21) Appl. No.: 11/241,543

(22) Filed: Sep. 30, 2005

(65) Prior Publication Data

US 2006/0077592 A1  Apr. 13, 2006

(30) Foreign Application Priority Data

Sep. 30, 2004  (JP)  ............................. 2004-287446

(51) Int. Cl.
*G11B 15/64*  (2006.01)
(52) U.S. Cl. .................................................. 360/235.1
(58) Field of Classification Search ............. 360/235.1, 360/125.39, 125.71, 128, 294.7, 317; 29/603.14
See application file for complete search history.

(56) References Cited

U.S. PATENT DOCUMENTS

| | | | |
|---|---|---|---|
| 6,661,605 B1 * | 12/2003 | Pust et al. ............... | 360/125.71 |
| 6,700,752 B2 * | 3/2004 | Dimitrov et al. ........... | 360/317 |
| 6,747,841 B1 * | 6/2004 | Olim et al. ............ | 360/125.39 |
| 6,754,050 B2 * | 6/2004 | Kong et al. ................ | 360/317 |
| 7,092,208 B2 * | 8/2006 | Zou et al. .................... | 360/128 |
| 7,095,587 B2 * | 8/2006 | Kurita et al. ................ | 360/128 |
| 7,199,982 B2 * | 4/2007 | Suk .......................... | 360/294.7 |
| 7,269,889 B2 * | 9/2007 | Ueda et al. ............... | 29/603.14 |
| 2004/0008451 A1 * | 1/2004 | Zou et al. ................... | 360/317 |
| 2006/0023367 A1 * | 2/2006 | Suk ............................. | 360/323 |

OTHER PUBLICATIONS

Masayuki Kurita and Kenji Suzuki, "Flying Height Adjustment Technologies of Magnetic Head Sliders", IEEE Transactions on Magnetics, vol. 40, No. 1, Jan. 2004.

* cited by examiner

*Primary Examiner*—Tianjie Chen
(74) *Attorney, Agent, or Firm*—Townsend and Townsend and Crew LLP; Rambod Nader

(57) ABSTRACT

In a magnetic disk device, cost reduction is designed by improving productivity, and increase in recording density and increase in capacity of the device or size reduction are designed with reliability being ensured. In one embodiment, a magnetic disk device has a magnetic disk arranged rotatably, a magnetic head slider arranged in a manner of facing a surface of the magnetic disk, and a driving device for moving the magnetic head slider in a radial direction of the surface of the magnetic disk. The magnetic head slider has a silicon slider-substrate-portion and a thin-film head portion which is formed on the slider substrate portion using a thin-film process and forms an air-bearing surface along with the slider substrate portion. The thin-film head portion has recording/reproduction elements facing the surface of the magnetic disk, and a ceramic insulation film has alumina and silicon-based ceramics in order to have a coefficient of linear expansion approximately equal to that of the silicon slider-substrate-portion.

6 Claims, 10 Drawing Sheets

SILICON-MADE MAGNETIC HEAD SLIDER

CROSS-REFERENCES TO RELATED APPLICATIONS

This application claims priority from Japanese Patent Application No. JP2004-287446, filed Sep. 30, 2004, the entire disclosure of which is incorporated herein by reference.

BACKGROUND OF THE INVENTION

The present invention relates to a magnetic disk device and a magnetic head slider and, more particularly, to a magnetic head slider having a thin-film head portion formed on a slider substrate portion using a thin-film process and a magnetic disk device using the slider.

In the magnetic disk device, a magnetic head slider mounted with a recording/reproduction element flies from a magnetic disk due to a wedge film effect of air, so that recording/reproduction of magnetic data on the magnetic disk is performed. To realize high recording density of the magnetic disk device and resultant increase in capacity of the device or size reduction, it is effective that distance between the magnetic head slider and the magnetic disk (flying height of the slider) is reduced to increase line recording density. Recently, the flying height of the slider is reduced to about 10 nm or at most 10 nm.

A typical magnetic head slider for use in a conventional magnetic disk device includes one which is configured to have a slider substrate portion formed using a sintered-body of alumina mixed with titanium carbide (sometimes expressed as AlTiC) and a thin-film head portion that is formed on the slider substrate portion using a thin-film process and forms an air-bearing surface along with the slider substrate portion. The thin-film head portion is configured to have an alumina insulation film having a coefficient of linear expansion approximately equal to that of the slider substrate portion.

Such a conventional, typical magnetic-head-slider is produced by stacking a metal film, ceramic insulation film, resin film and the like on a wafer forming the AlTiC slider substrate using the thin-film process, and forming a plural number of read/write elements, and finally cutting out individual magnetic-head-slider from the wafer by machining. However, according to such a production method, since the magnetic head slider is cut out by machining, productivity has been low.

Therefore, as described in non-patent literature 1 (IEEE Transactions on Magnetics, vol. 40, 1, 332-336, "Flying-height adjustment technologies of magnetic head sliders"), a magnetic head slider which does not use AlTiC as a material of the slider substrate portion but uses silicon is devised. The use of silicon as the material of the slider substrate portion is for cost reduction by cutting the slider substrate by etching instead of machining to form a slider profile.

BRIEF SUMMARY OF THE INVENTION

It was found that when the material of the slider substrate portion was merely substituted for the silicon material in the conventional magnetic-head-slider comprising the slider substrate portion formed using AlTiC and the thin-film head portion having the alumina insulation film, although an advantage of low process cost was provided, thermal irregularity was produced in the thin-film head portion due to change of ambient temperature, resulting in a decrease in reliability. The thermal irregularity due to the change of ambient temperature is a small irregularity produced at low or high temperature in an air bearing surface (sometimes referred to as air-bearing surface), which is to be smoothly finished, because of the difference in the coefficient of linear expansion between the slider substrate portion and the thin-film head portion.

That is, when the coefficient of linear expansion of the thin-film head portion is large compared with the slider substrate portion, a convex portion is produced at high temperature in the air-bearing surface that is to be smoothly finished. Then, the distance (flying height) between the magnetic head slider and the magnetic disk is reduced compared with a designed value, resulting in an increase in the possibility of contact of the magnetic head slider with the magnetic disk. When the magnetic head slider contacts the magnetic disk, the magnetic data cannot be recorded/reproduced due to the effect of frictional vibration, or the recording/reproduction element may be damaged due to abrasion. To prevent the contact even at high temperature, designed flying height or the distance between the recording/reproduction element and the magnetic disk must be sufficiently large, resulting in the difficulty in improving recording/reproduction performance. In addition, the thin-film head portion is retracted from the air-bearing surface at low temperature, and the distance between the read/write element and the magnetic disk becomes too large compared with the designed value, resulting in a reduction in read/write performance.

Contrarily, when the coefficient of linear expansion of the thin-film head portion is small compared with the slider substrate portion, a convex portion is produced in the air-bearing surface at low temperature, resulting in an increase in the risk of the contact of the magnetic head slider with the magnetic disk. In addition, a concave portion is produced at high temperature, resulting in an excessively large distance between the recording/reproduction element and the magnetic disk compared with the designed value.

In the conventional, typical magnetic-head-slider, both of AlTiC as the material of the slider substrate and alumina as the material of the ceramic insulation film, having large weight in the thin-film head, have a similar coefficient of linear expansion of about 7 ppm/K (7 millionth per degree of temperature), and the concern of the thermal irregularity due to the change of ambient temperature has been not significant. However, in the magnetic head slider of the patent literature 1, the coefficient of linear expansion of silicon, which is the material of the slider substrate, is about 3 ppm/K, and when alumina is used for the ceramic insulation film of the thin-film head, the coefficient of linear expansion of alumina is too large compared with that of the slider substrate, because it is about 7 ppm/K. In addition, in the magnetic head slider of the patent literature 1, when silica is used for the ceramic insulation film of the thin-film head portion, the coefficient of linear expansion of silica is too small compared with the coefficient of linear expansion of the slider substrate portion, because it is about 0.6 ppm/K.

The invention intends to provide a magnetic disk device and a magnetic head slider in which the productivity of the magnetic head slider is improved and thus cost reduction can be designed, and the increase in recording density and increase in capacity of the device or size reduction can be designed with reliability being ensured.

A first aspect of the invention is a magnetic disk device having a magnetic disk arranged rotatably, a magnetic head slider arranged in a manner of facing a surface of the magnetic disk, and a driving unit for moving the magnetic head slider in a radial direction of the surface of the magnetic disk, which performs recording/reproduction in a condition that an air stream is generated between the magnetic disk that is rotating and the magnetic head slider, to cause the magnetic head slider to fly; wherein the magnetic head slider has a silicon slider-substrate-portion and a thin-film head portion which is formed on the slider substrate portion using the thin film process and forms the air-bearing surface along with the slider substrate portion, and the thin-film head portion has a recording/reproduction element facing the surface of the magnetic disk and a ceramic insulation film which has alumina and silicon-based ceramics in order to have a coefficient of linear expansion approximately equal to that of the silicon slider substrate.

A second aspect of the invention is a magnetic disk device having a magnetic disk arranged rotatably, a magnetic head slider arranged in a manner of facing a surface of the magnetic disk, and a driving unit for moving the magnetic head slider in a radial direction of the surface of the magnetic disk, which performs recording/reproduction in a condition that an air stream is generated between the magnetic disk that is rotating and the magnetic head slider, to cause the magnetic head slider to fly; wherein the magnetic head slider has a silicon slider-substrate-portion and a thin-film head portion which is formed on the slider substrate portion using the thin film process and forms the air-bearing surface along with the slider substrate portion, and the thin-film head portion has a recording/reproduction element facing the surface of the magnetic disk and a ceramic insulation film for protecting the recording/reproduction element, and the ceramic insulation film comprises a thin-film portion formed from alumina and a thin-film portion formed from the silicon-based ceramics.

A more preferable, specific configuration example in such a second aspect of the invention is as follows:

(1) the thin-film portion formed from the silicon-based ceramics comprises any one of thin-film portions of a thin-film portion formed from silica, thin-film portion formed from silicon carbide, or thin-film portion formed from silicon nitride;

(2) in the ceramic insulation film near the recording/reproduction element, the thin-film portion formed from alumina is 15% to 50% in volume, and the remainder of the insulation film is the thin film portion formed from silicon-based ceramics; and (3) in the thin-film portion formed from the silicon-based ceramics, which has a metal film forming the recording/reproduction element, a ratio of the thin-film portion formed from alumina as a portion distant from the metal film is large compared with a portion near the metal film.

A third aspect of the invention is a magnetic disk device, which has a magnetic disk arranged rotatably, a magnetic head slider arranged in a manner of facing a surface of the magnetic disk, and a driving device for moving the magnetic head slider in a radial direction of the surface of the magnetic disk, which performs recording/reproduction in a condition that an air stream is generated between the magnetic disk that is rotating and the magnetic head slider, to cause the magnetic head slider to fly; wherein the magnetic head slider has a silicon slider-substrate-portion and a thin-film head portion which is formed on the slider substrate portion using the thin film process and forms the air-bearing surface along with the slider substrate portion, and the thin-film head portion has a recording/reproduction element facing the surface of the magnetic disk and a ceramic insulation film for protecting the recording/reproduction element, and the ceramic insulation film comprises a thin-film portion formed from alumina and a thin-film portion of alumina mixed with silicon-based ceramics.

A more preferable, specific configuration example in such a third aspect of the invention is as follows:

(1) the thin-film portion of alumina mixed with silicon-based ceramics comprises any one of mixed thin-film portions of a thin-film portion of alumina mixed with silica, thin-film portion of alumina mixed with silicon carbide, or thin-film portion of alumina mixed with silicon nitride;

(2) in the ceramic insulation film near the recording/reproduction element, the thin-film portion formed from alumina is 15% to 50% in volume, and the remainder of the insulation film is the thin film portion of alumina mixed with silicon-based ceramics; and (3) in the thin-film portion of alumina mixed with silicon-based ceramics having a metal film forming the recording/reproduction element, a ratio of the thin-film portion formed from alumina as a portion distant from the metal film is large compared with a portion near the metal film.

A fourth aspect of the invention is a magnetic disk device having a magnetic disk arranged rotatably, a magnetic head slider arranged in a manner of facing a surface of the magnetic disk, and a driving unit for moving the magnetic head slider in a radial direction of the surface of the magnetic disk, which performs recording/reproduction in a condition that an air stream is generated between the magnetic disk that is rotating and the magnetic head slider, to cause the magnetic head slider to fly; wherein the magnetic head slider has a silicon slider-substrate-portion and a thin-film head portion which is formed on the slider substrate portion using the thin film process and forms the air-bearing surface along with the slider substrate portion, and the thin-film head portion has a recording/reproduction element facing the surface of the magnetic disk and a ceramic insulation film for protecting the recording/reproduction element, and the ceramic insulation film comprises a thin-film of alumina mixed with silicon-based ceramics.

A more preferable, specific configuration example in such a fourth aspect of the invention is as follows:

(1) the ceramic insulation film comprises any one of mixed thin-films of a thin-film of alumina mixed with silica, thin-film of alumina mixed with silicon carbide, or thin-film of alumina mixed with silicon nitride.

According to the magnetic disk device and the magnetic head slider of the invention, the silicon slider-substrate-portion is used, whereby the productivity of the magnetic head slider is improved and thus cost reduction can be designed, and the thermal irregularity of the thin-film head due to the change of ambient temperature is suppressed, whereby the contact of the magnetic head slider to the magnetic disk is prevented and thus reliability is ensured, in addition, low flying height of the magnetic head slider is enabled and thus increase in recording density and increase in capacity of the device or size reduction can be designed.

DETAILED DESCRIPTION OF THE INVENTION

Hereinafter, several embodiments of the invention are described using drawings. Same references in figures in respective embodiments indicate same or corresponding articles. First, a magnetic disk device and a magnetic head slider of a first embodiment of the invention are described using FIG. 1 to FIG. 7.

Figure 1:
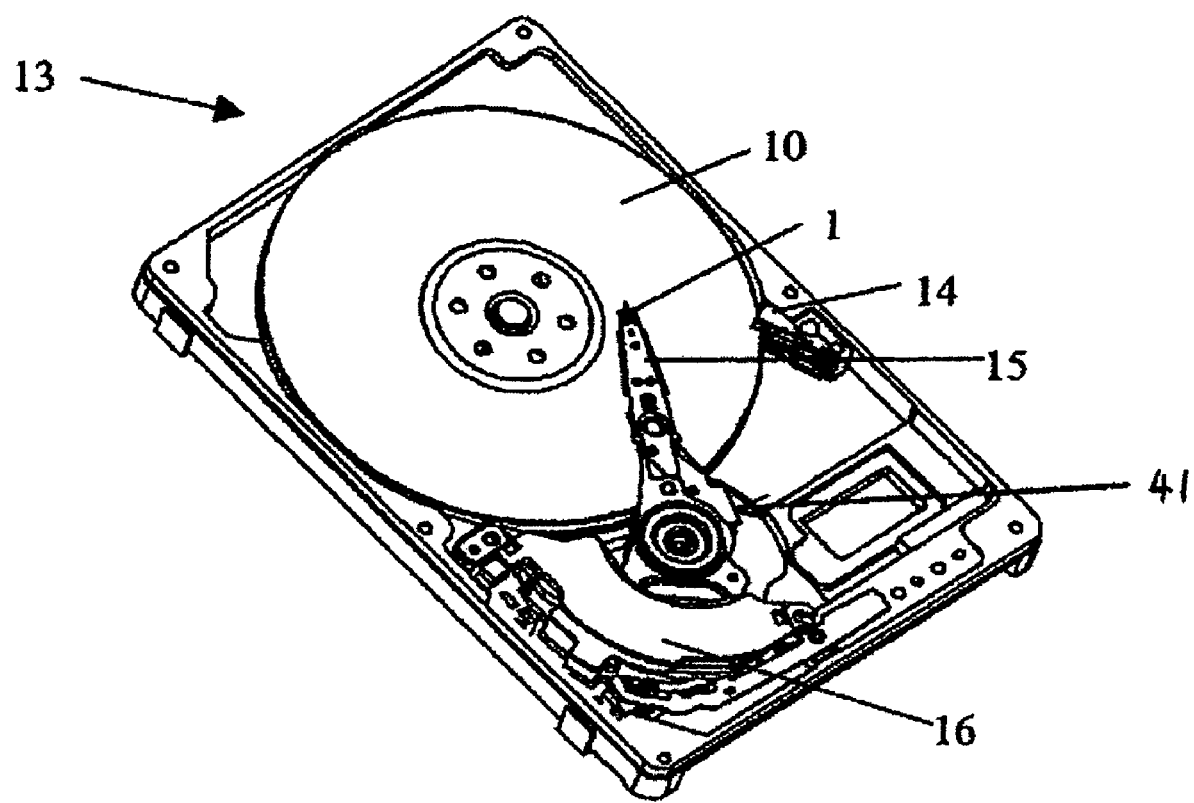
FIG. 1 is a perspective view of a magnetic disk device of a first embodiment of the invention.

A general configuration of the magnetic disk device according to the first embodiment is described with reference to FIG. 1. FIG. 1 is a perspective view of the magnetic disk device of the first embodiment of the invention.

A magnetic disk device 13, which is used for a hard disk device mounted in a computer unit, is configured to have a magnetic disk 10 arranged rotatably, a magnetic head slider 1 arranged in a way of facing a surface of the magnetic disk, and a driving unit 41 for moving the magnetic head slider 1 in a radial direction of the surface of the magnetic disk 10. The magnetic disk device 13 is configured in a way of generating an air stream between the magnetic disk 10 that is rotating and the magnetic head slider 1, flying the magnetic head slider 1 from the magnetic disk 10 with a small gap by a wedge effect due to the air stream, and performing recording/reproduction with the magnetic disk 10 being not directly solid-contacted with the magnetic head slider 1. To realize high recording density of the magnetic disk device 13 and resultant increase in capacity of the device or size reduction, it is effective that the distance between the slider 1 and the magnetic disk 10, or flying height of the slider, is reduced to increase line recording density. Recently, the flying height of the slider is reduced to about 10 nm or at most 10 nm.

The magnetic disk 10, which is a disk-like medium in which magnetic data are stored, is mounted on a spindle motor placed in a chassis and rotated at high speed. The magnetic disk 10 is configured to have a hard substrate such as glass and a magnetic film deposited on the hard substrate using thin-film formation means such as vacuum evaporation.

The magnetic head slider 1, which is for recording/reproduction of data with respect to the magnetic disk 10, is mounted on an end of a flat-spring-like load beam 15 forming a part of the driving unit 41, and given pressing load onto a surface of the magnetic disk by the load beam 15. That is, the magnetic head slider 1 relatively runs on the magnetic disk 10, and reads magnetic data recorded on the magnetic disk 10 and writes data into the magnetic disk 10.

The driving unit 41 is configured to have the load beam 15 and a voice coil motor 16. The load beam 15 is supported by the voice coil motor 16 in a rotatably movable manner. Accordingly, the magnetic head slider 1 is driven by the voice coil motor 16 via the load beam 15 and moved to any radial position on the magnetic disk 10, and performs recording/reproduction on an entire surface of the magnetic disk. When the device is suspended or while a recording/reproduction command is not given in a certain period, the magnetic head slider 1 escapes onto a ramp 14 located outside the magnetic disk 10, and held in a distant condition from the surface of the magnetic disk 10. While a device having a load/unload mechanism is shown here, in a contact-start-stop type magnetic disk device 13, in which the magnetic head slider 1 waits at a certain area in the magnetic disk 10 while the device is suspended, the advantages of the invention can be also obtained.

Figure 2:
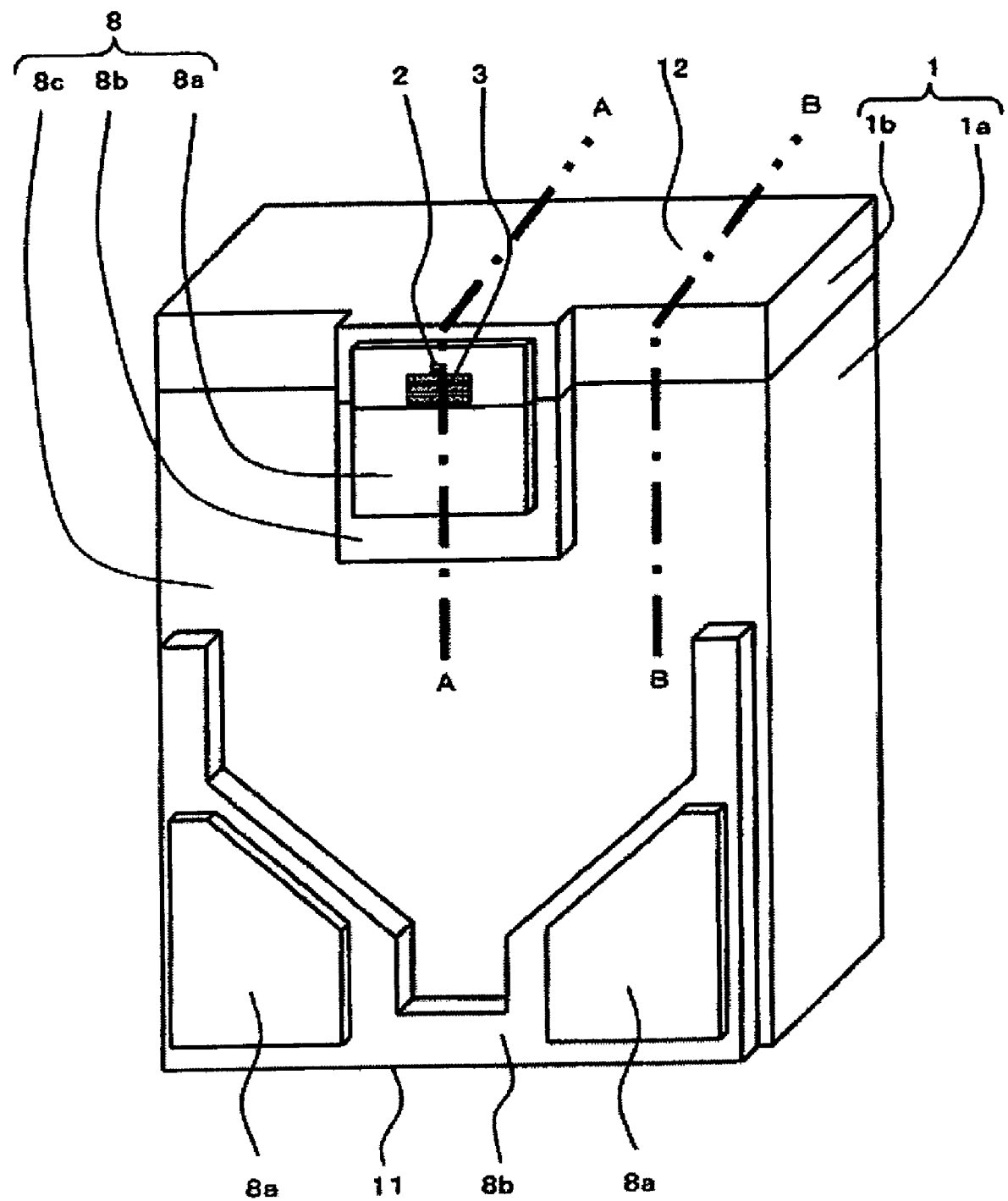
FIG. 2 is a perspective view of a magnetic head slider for use in the magnetic disk device of the first embodiment.

Next, a specific structure of the magnetic head slider 1 is described with reference to FIG. 2. FIG. 2 is a perspective view of a magnetic head slider for use in the magnetic disk device 13 of the embodiment.

The magnetic head slider 1 is configured to have an air inflow end-face 11, an air-bearing surface 8 and an air outflow end-face 12. Here, the air-bearing surface 8 is configured to have a rail surface 8a, shallow-groove surface 8b, and deep-groove surface 8c. The magnetic head slider 1 is configured to have a slider substrate portion 1a formed from silicon, and a thin-film head portion 1b formed on the slider substrate portion 1a using the thin-film process.

The magnetic head slider 1 comprises the silicon substrate (wafer) portion 1a and a thin-film head portion 1b. The thin-film head portion 1b is stacked on the substrate 1a in a wafer state by repeating steps including sputtering, plating and polishing, and then a large number of sliders 1 are cut out from the wafer by etching and thus formed. Although the magnetic head sliders are cut out from the wafer by machining in the conventional AlTiC substrate, in the embodiment, the magnetic head sliders can be cut out at a low cost from the silicon substrate by etching.

The magnetic head slider 1 is in a shape of approximately rectangular prism, for example, 1.25 mm long, 1.0 mm wide, and 0.3 mm thick, and comprises six faces in total of the air-bearing surface 8, the air inflow end-face 11, the air outflow end-face 12, both side faces, and a back face. The air-bearing surface 8 is finished smoothly by polishing. The size of the slider includes further small size, or a standard of 0.85 mm long, 0.7 mm wide, and 0.23 mm thick. Even in the small magnetic-head-slider, advantages of the invention are also obtained.

Slight difference in level (step bearing) is provided on the air-bearing surface 8 by a process such as ion milling or etching, which faces the magnetic disk 10 and generates air pressure, and acts as an air bearing for supporting load applied to the back face.

The air-bearing surface 8 has the difference in level as above, and divided into three types of surfaces substantially parallel to each other. Those are three types of a rail surface 8a as the nearest surface to the magnetic disk 1, a shallow groove surface 8b as a step bearing surface about 100 nm to 200 nm deep with respect to the rail surface, and a deep groove surface 8c about 1 μm deep with respect to the rail surface. When the air stream caused by rotation of the magnetic disk 1 enters the rail surface 8a from the shallow groove surface 8b, it is compressed by a vanishing channel, and positive air pressure is generated. On the other hand, when the air stream enters the deep groove surface 8c from the rail surface 8a or the shallow groove surface 8b, negative air pressure is generated due to the channel that is widened.

The magnetic head slider 1 is designed to fly in such an attitude that a flying level at a side of air inflow end 11 is larger than a flying level at a side of air outflow end 12. Therefore, an air-bearing surface near the outflow end maximally approaches the disk. Since the rail surface 8a projects with respect to the surrounding shallow groove surface 8b and deep groove surface 8c in the vicinity of the outflow end, the rail surface 8a maximally approaches the disk unless a slider pitch attitude and a roll attitude are inclined beyond a certain limit. A recording element 2 and a reproduction element 3 are formed in an area belonging to the thin-film head portion 1b in the rail surface 8a. A pattern of the flying face 8 is designed such that the load pressed by the load beam is well balanced to the positive and negative air pressure generated on the air-bearing surface 8, so that the distance from the recording element 2 and reproduction element 3 to the disk is maintained at an appropriate value of about 10 nm or less.

Although the magnetic head slider 1 having a double-step-bearing air-bearing surface, in which the air-bearing surface 8 is formed from the three types of surfaces 8a, 8b, and 8c substantially parallel to each together, has been described here, the same advantages of the invention can be obtained even in a magnetic head slider having a step-bearing air-bearing surface which is formed by at least four types of parallel surfaces.

Figure 3:
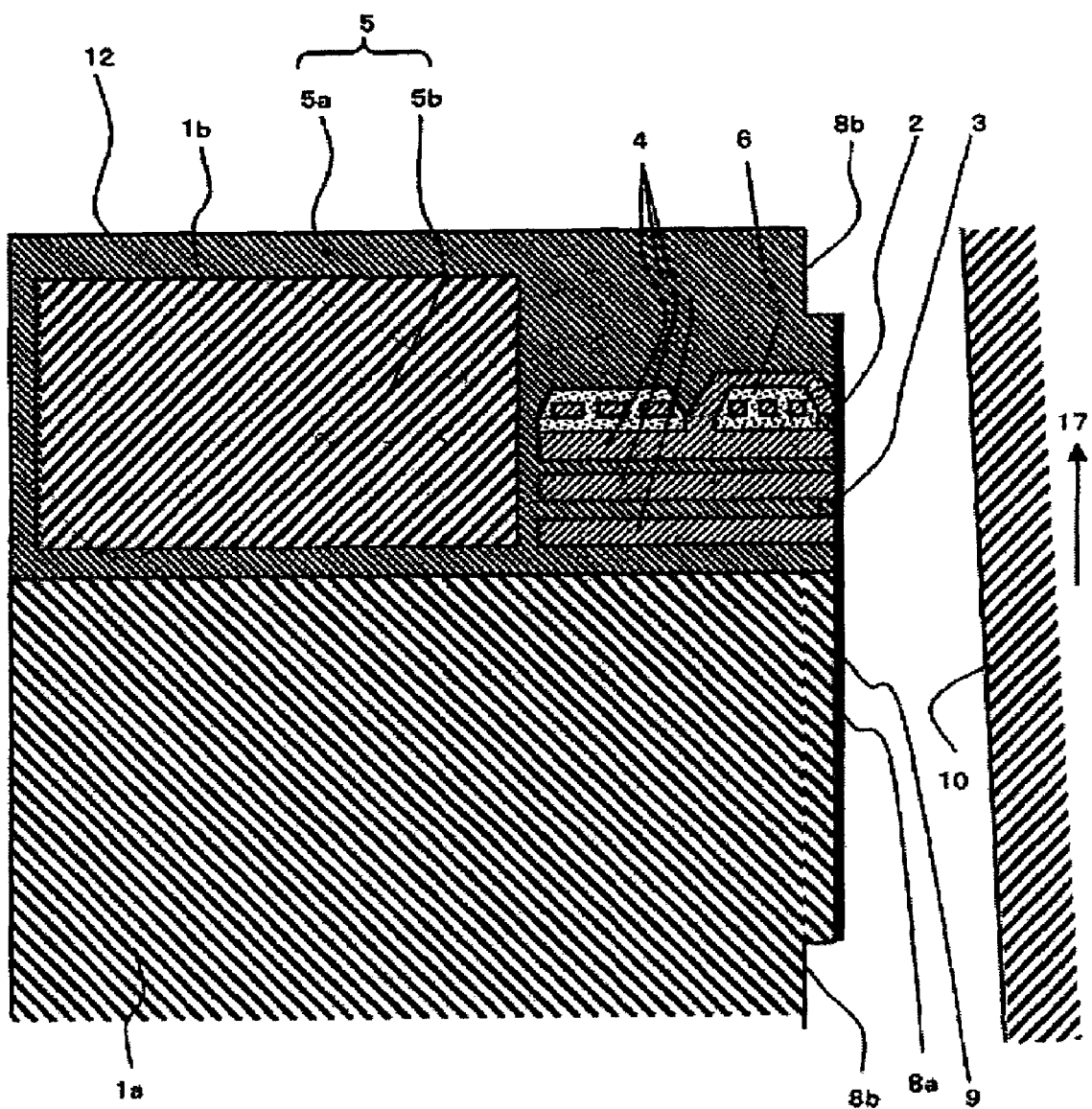
FIG. 3 is a partial sectional view of the magnetic head slider for use in the magnetic disk device of the first embodiment.

Next, a detailed structure of the thin-film head portion 1b is described with reference to FIG. 3. FIG. 3 is a partial sectional view of a magnetic head slider for use in the magnetic disc device 13 of the embodiment. In FIG. 3, 17 indicates a rotational direction of the magnetic disk 10.

The thin-film head portion 1b for recording/reproduction of magnetic data has an inductive recording element 2 that generates a magnetic field between magnetic poles using current flowing through a coil, thereby recording magnetic data, and a magnetoresistance-type reproduction element 3 that measures the change of a resistance value due to the magnetic field. Specifically, it comprises a metal film 4, ceramic insulation film 5, resin film 6 and the like formed on the substrate 1a using a thin-film process including plating, sputtering, or polishing. The step bearing such as rail surface 8a and shallow groove surface 8b is formed in the air-bearing surface. A carbon protection film 9 having a thickness of several nanometers is formed on the rail surface 8a in order to prevent wear of the surface 8a even if slight contact to the disk 10 occurs for a short time, and prevent corrosion of the recording element 2 and the reproduction element 3. There are two types of recording methods, or longitudinal (in-plane) and vertical magnetization directions on the magnetic disk 10, and structures of the recording/reproduction element and the magnetic disk 10 varies depending on the method, however, the advantages of the invention can be obtained equally in either method.

The ceramic insulation film 5 is configured to have alumina and silicon-based ceramics, so that it has approximately the same coefficient of linear expansion as that of the silicon slider-substrate-portion. Specifically, the ceramic insulation film 5 comprises two materials of an alumina thin-film portion 5a formed from alumina and a silica thin-film portion 5b formed from silica. As described later, a volume ratio of the alumina thin-film portion 5a to the silica thin-film portion 5b is determined such that synthesis of thermal expansion levels of the two is approximately equal to a thermal expansion level of the silicon substrate 1a.

Figure 4:
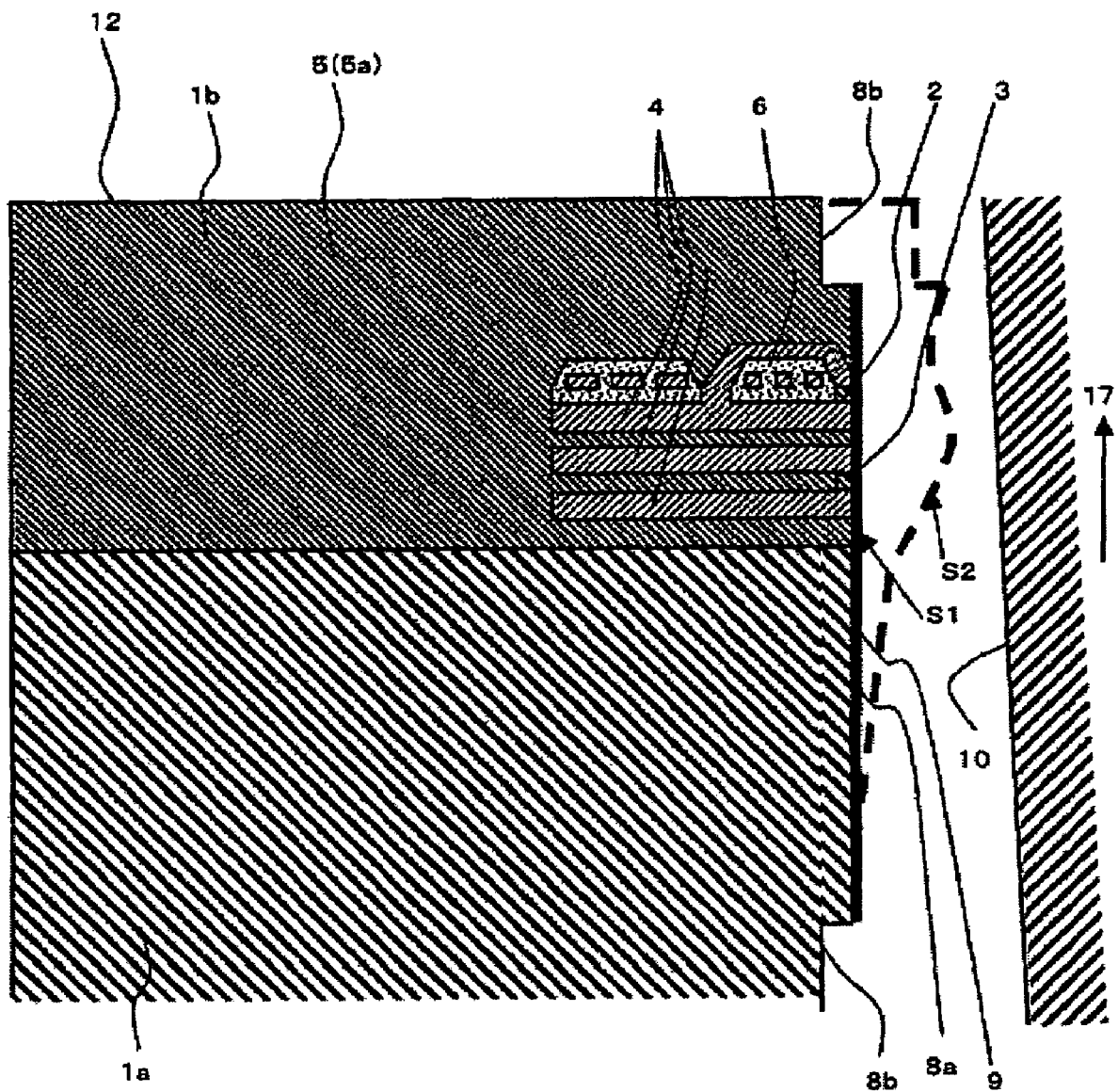
FIG. 4 is a view for illustrating thermal irregularity of a magnetic head slider (comparative example 1)
Figure 5:
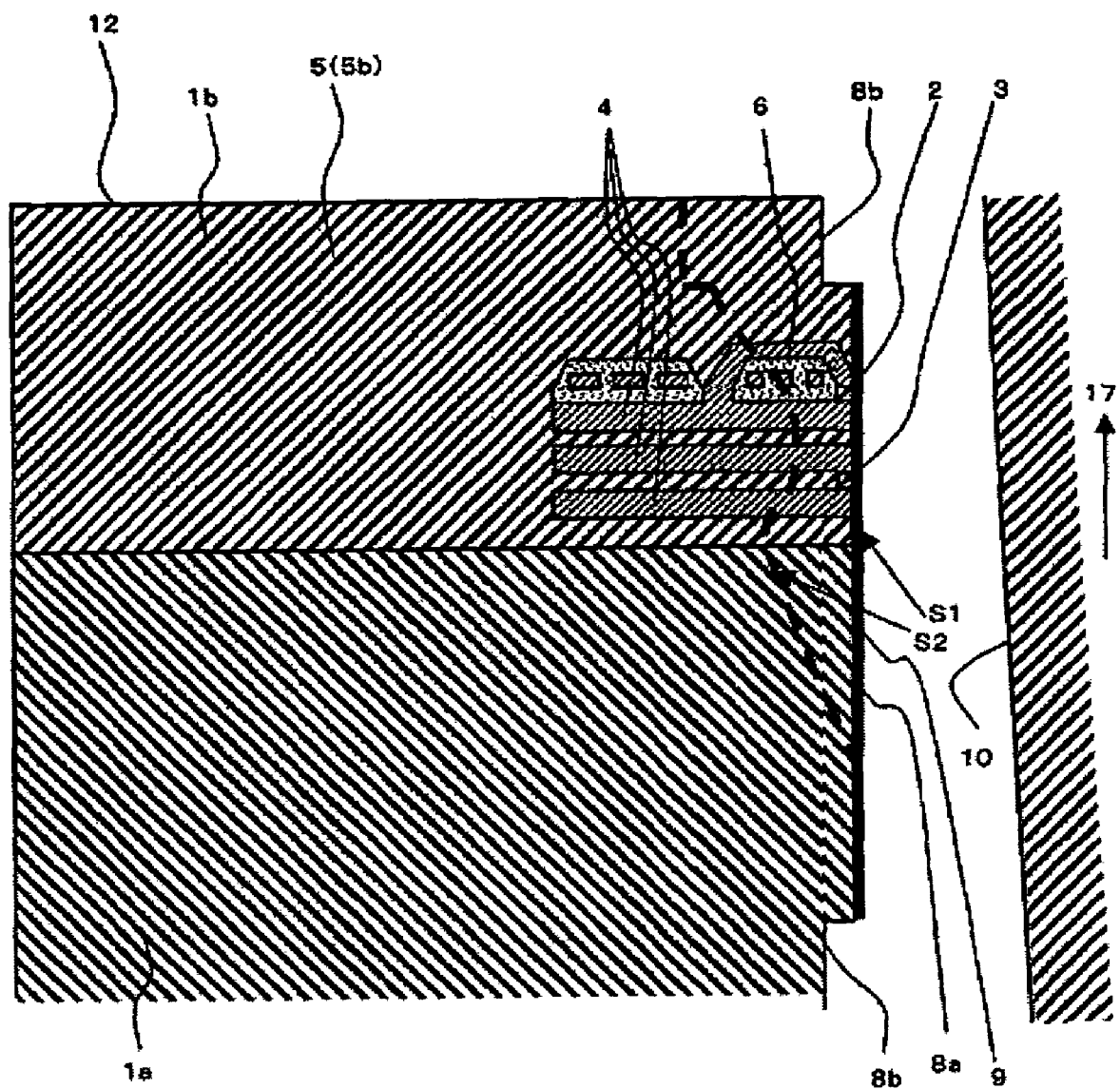
FIG. 5 is a view for illustrating thermal irregularity in a magnetic head slider (comparative example 2)
Figure 6:
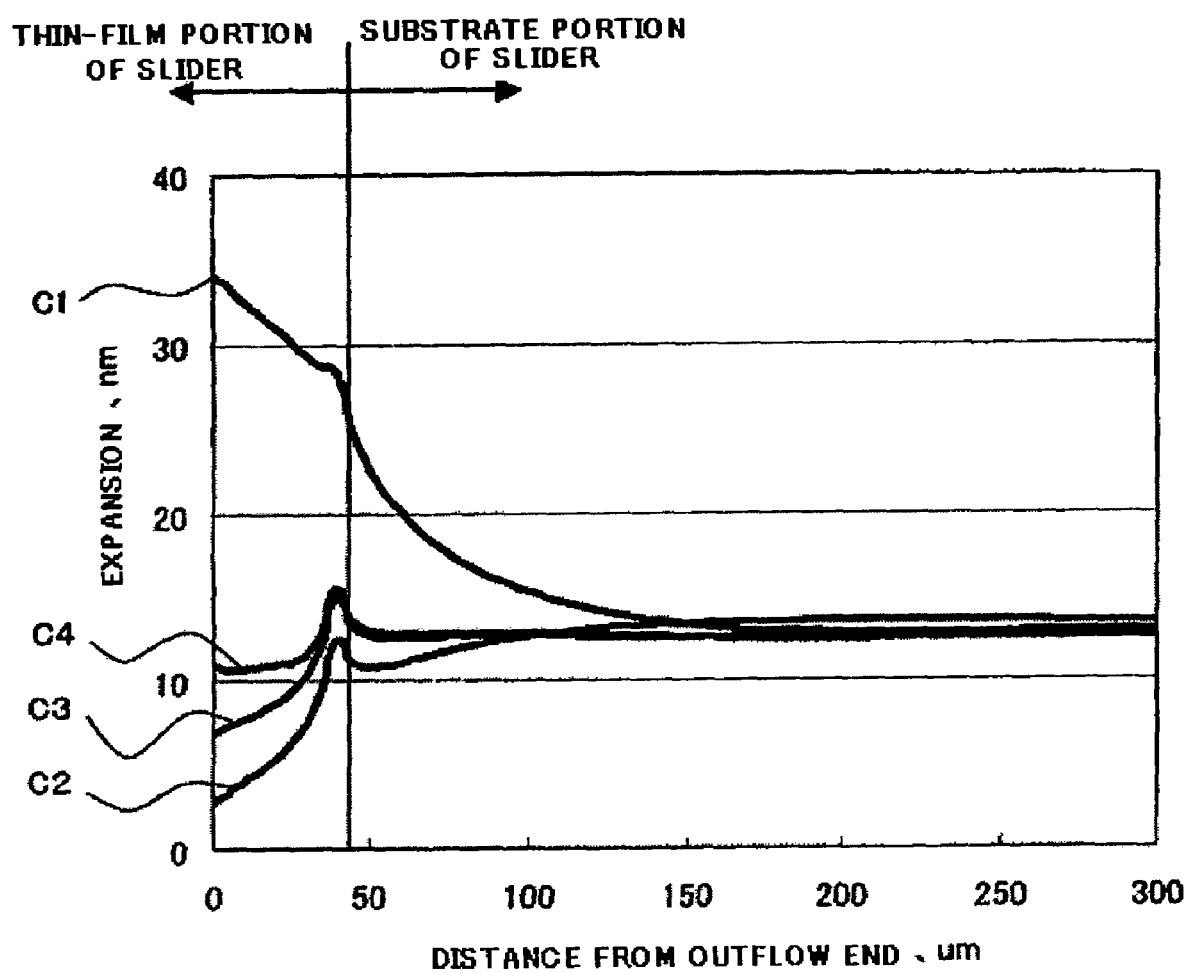
FIG. 6 is a diagram showing thermal expansion level against ambient-temperature rise obtained by thermal deformation analysis.

Here, thermal irregularity of the thin-film head portion 1b due to the change of ambient temperature is described with reference to FIG. 4 to FIG. 6. FIG. 4 is a view illustrating the thermal irregularity of the magnetic head slider (comparative example 1) comprising the slider substrate 1a formed from silicon and the thin-film head portion 1b having the ceramic insulation film 5 formed from alumina, FIG. 5 is a view illustrating the thermal irregularity of the magnetic head slider (comparative example 2) comprising the slider substrate 1a formed from silicon and the ceramic insulation film 5 formed from silica, and FIG. 6 is a view illustrating a thermal expansion level against ambient temperature rise obtained by thermal deformation analysis.

As a material of the ceramic insulation film 5 for protecting the recording/reproduction elements 2, 3 or layer insulation, alumina has been used in the conventional AlTiC slider. The coefficient of linear expansion of alumina is almost the same as that of AlTiC, about 7 ppm/K. Here, ppm is one millionth. In a combination of the AlTiC slider-substrate-portion and the alumina ceramic-insulation-film, even if the ambient temperature during use of the device is different from that during polishing the air-bearing surface, the irregularity due to the difference in the coefficient of linear expansion between the slider substrate portion and the ceramic insulation film was not produced. On the contrary, in the case that the slider substrate portion 1a formed from silicon is used, care is necessary for the thermal irregularity of the ceramic insulation film 5.

Since the coefficient of linear expansion of silicon is about 3 ppm/K, when alumina having the coefficient of linear expansion of about 7 ppm/K is used for the ceramic insulation film 5 (5a), the thin-film head portion 1b projects at high temperature (see a dotted-line portion in FIG. 4), and the thin-film head portion 1b dents at low temperature. For example, an increase of 30 degrees in ambient temperature causes a projection of 15 nm or more in an air outflow end 12 with respect to the substrate portion. In FIG. 4, a surface profile S1 shows a surface profile at room temperature in a normal condition, and a surface profile S2 schematically shows a surface profile at high temperature. As found from FIG. 4, at high temperature, the minimum value of distance between the magnetic disk 10 and the magnetic head slider 1 is smaller than a designed value, and a possibility of contact between the disk 10 and the magnetic head slider 1 increases. Contrarily at low temperature, a concave portion is produced with respect to the substrate portion. The distance from the recording/reproduction elements 2, 3 to the disk medium becomes large compared with a designed value, resulting in obstacle in recording/reproduction performance.

When silica having the coefficient of linear expansion of 0.5 to 0.6 ppm/K is used for the ceramic insulation film 5 (5b), the thin-film head portion 1b dents at high temperature (see a dotted-line portion in FIG. 5), and the thin-film head portion 1b projects at low temperature. For example, an increase of 30 degrees in ambient temperature causes a dent of about 10 nm in the air outflow end 12 with respect to the substrate portion. In FIG. 5, a surface profile S1 shows a surface profile at room temperature in a normal condition, and a surface profile S2 conceptually shows a surface profile at high temperature. As found from FIG. 5, the minimum value of the distance between the magnetic disk 10 and the magnetic head slider 1 is larger than the designed value, resulting in obstacle in recording/reproduction performance. Contrarily at low temperature, the minimum value of the distance between the magnetic disk 10 and the magnetic head slider 1 is smaller than the designed value, resulting in an increase in the possibility of contact between the disk 10 and the magnetic head slider 1.

Therefore, in the case that the slider substrate portion 1a formed from silicon is used, for the material of the ceramic insulation film 5, the coefficient of linear expansion is too large in alumina, and the coefficient of linear expansion is too small in silica.

The ceramic insulation film 5 of the embodiment shown in FIG. 3 comprises thin-film portions of two materials of the alumina thin-film portion 5a and the silica thin-film portion 5b. The volume ratio of the alumina thin-film portion 5a to the silica thin-film portion 5b is determined such that synthesis of thermal expansion levels of the two 5a and 5b is approximately equal to the thermal expansion level of the silicon substrate portion 1a. Thermal expansion level of the magnetic head slider 1 in the case of ambient-temperature rise of 30 degrees is obtained by the thermal deformation analysis, and the results are shown in FIG. 6. Compared with an expansion level curve C1 in the case of alumina of 100% in the ceramic insulation film 5 and an expansion level curve C2 in the case of silica of 100%, an expansion level curve C3 in the case of alumina of 33% and silica of 67% maintains a flat pattern from the slider substrate portion to the slider thin-film portion. Therefore, it is the most desirable or best case that a ratio of alumina is about 30% to 35%, at which the force for projecting the alumina thin-film portion 5a is balanced with the force for denting the silica thin-film portion 5b.

It is a next-desirable or second-best case that the ratio of alumina is about 15% to 30%. Although the projection develops in some degree at low temperature, since the width of temperature change is large at a high temperature side compared with a low temperature side in most of the use conditions of the magnetic disc device 13, when the reliability at high temperature is regarded as important, the ratio of alumina is desirably 15% to 30%. Furthermore, in order to reduce the thermal projection due to recording-current-heating, it is desirable that silica having the small coefficient of linear expansion is increased, and alumina is decreased. However, silicon in the slider substrate portion 1a has high thermal conductivity compared with the conventional AlTiC, therefore the thermal projection due to the recording-current-heating can be similarly reduced by using silicon as the substrate material.

In addition, the case that the ratio of alumina is 35% to 50% is a further next-desirable or better case, because the effect of reducing the projection can be still obtained compared with the case of alumina of 100%. The above is summarized in that the ratio of alumina is preferably about 15% to 50%.

However, the ratio as thus far described is a ratio in the vicinity of the recording/reproduction elements 2, 3 regarding a lateral direction of the slider (for example, a cross section area along A-A in FIG. 2). In an area where the recording/reproduction elements 2, 3 and the rail surface 8a are not present, for example, in a cross section area along B-B in FIG. 2, the ratio of alumina or the ratio of silica hardly affects on the contact possibility of the magnetic slider 1 to the magnetic disk 10 or the recording/reproduction performance.

Figure 7:
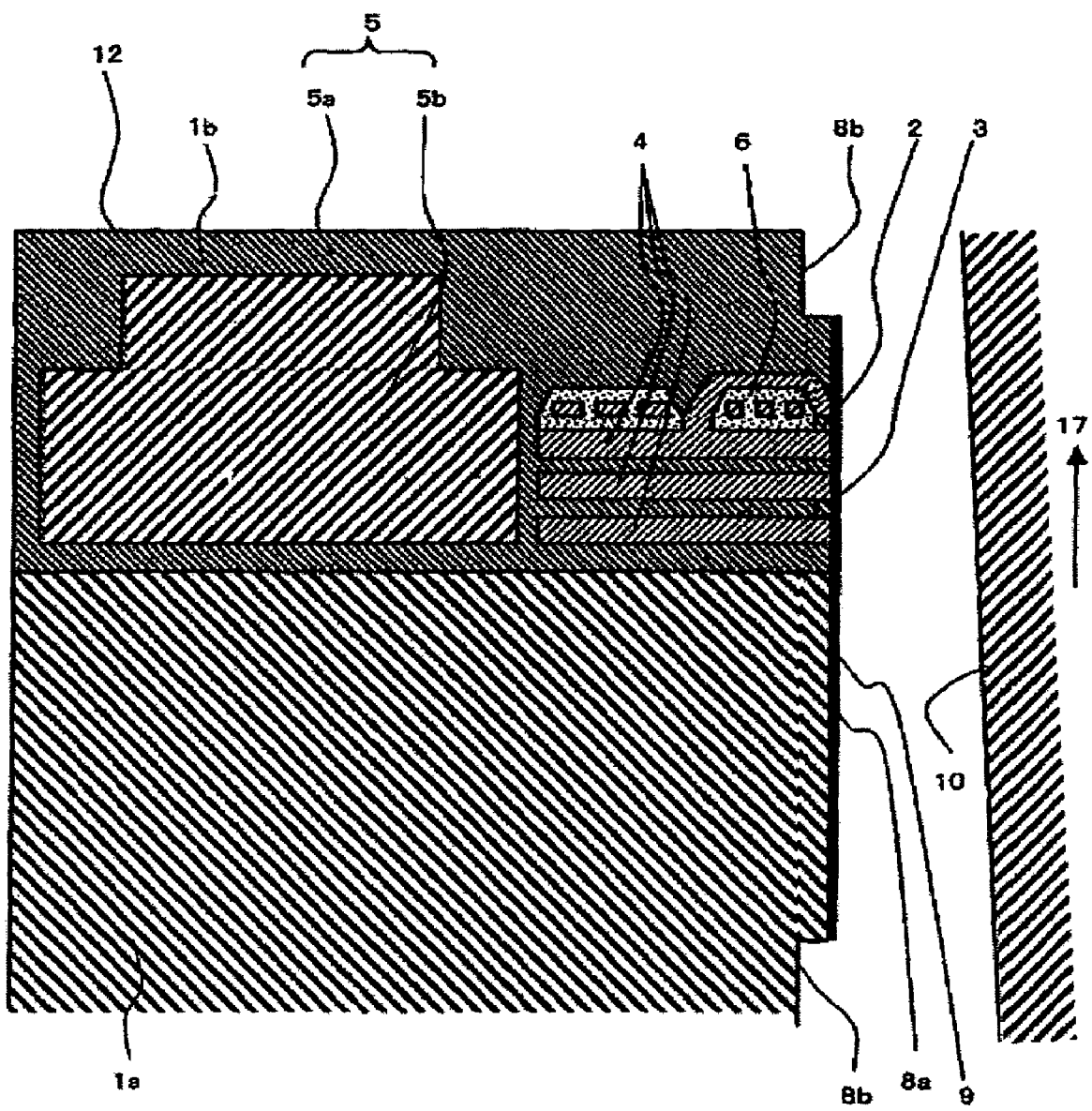
FIG. 7 is a partial sectional view of a modification of the magnetic head slider shown in FIG. 3.

A modification of the embodiment is described with reference to FIG. 7. FIG. 7 is a partial sectional view of a modification of the magnetic head slider shown in FIG. 3.

The metal film 4 in the thin-film head portion 1b is formed from a Permalloy magnetic-film comprising a composition including nickel, iron, or cobalt. Since Permalloy has a large coefficient of linear expansion of about 13 ppm/K compared with AlTiC, when the ambient temperature during use of the device increases compared with the processing temperature, thermal projection of the head in the order of nanometer occurs due to the metal film 4, causing the contact between the magnetic head slider 1 and the magnetic disk 10. The metal film 4 includes a copper film forming an inductive coil, which also causes the thermal projection of the head because it has a large coefficient of linear expansion compared with AlTiC.

Thus, taking into consideration of expansion of the metal film 4, the ratio of alumina in an area near the metal film 4 (area near the slider substrate portion 1a and the vicinity of the recording/reproduction elements 2, 3) was made to be different from that in an area distant from the metal film 4 (area distant from the slider substrate 1a and near the air outflow end 12) and a resultant magnetic-head-portion is the modification shown in FIG. 7. According to the configuration, projection level of the thin-film head portion 1b can be further reduced. The metal film 4 has a further large coefficient of linear expansion compared with the silicon substrate portion 1a and the alumina thin-film portion 5a. Therefore, the ratio of the silica thin-film portion 5b is increased in the vicinity (layer including the metal film 4) of the metal film 4, and the ratio of the alumina thin-film portion 5a is increased in the area (layer without the metal film 4) distant from the metal film 4, so that the coefficient of the linear expansion of the ceramic insulation film 5 is adjusted partially and finely. The expansion level curve C4 in FIG. 6 indicates a case that the area near the substrate 1a has alumina of 33%, and the ratio of alumina is increased in an upper area near the air outflow end 12 shown in FIG. 7. As found from the expansion level curve C4, further flat pattern is realized compared with the expansion level curve C3 in the case that alumina is simply 33%.

According to the embodiment, since the magnetic head slider 1 has a silicon slider-substrate portion 1a and a thin-film head portion 1b which is formed on the slider substrate portion 1a using the thin-film process and forms the air-bearing surface along with the slider substrate portion 1a, the silicon slider-substrate-portion 1a can be cut out by etching, and productivity of the magnetic head slider 1 is improved and thus cost reduction can be designed. Moreover, since the thin-film head portion 1b has the recording/reproduction elements 2, 3 facing the magnetic-disk surface and the ceramic insulation film 5, which has alumina and the silicon-based ceramics in order to have approximately the same coefficient of linear expansion as that of the silicon slider-substrate portion 1a, the thermal irregularity of the thin-film head due to change of ambient temperature is suppressed, whereby the contact of the magnetic head slider to the magnetic disk is prevented and thus reliability is ensured. In addition, low flying height of the magnetic head slider is enabled and thus increase in recording density and increase in capacity of the device or size reduction can be designed. In other words, since the ceramic insulation film 5 comprises the thin-film portion 5a formed from alumina and the thin-film portion 5b formed from silicon-based ceramic, such advantages can be obtained.

Figure 8:
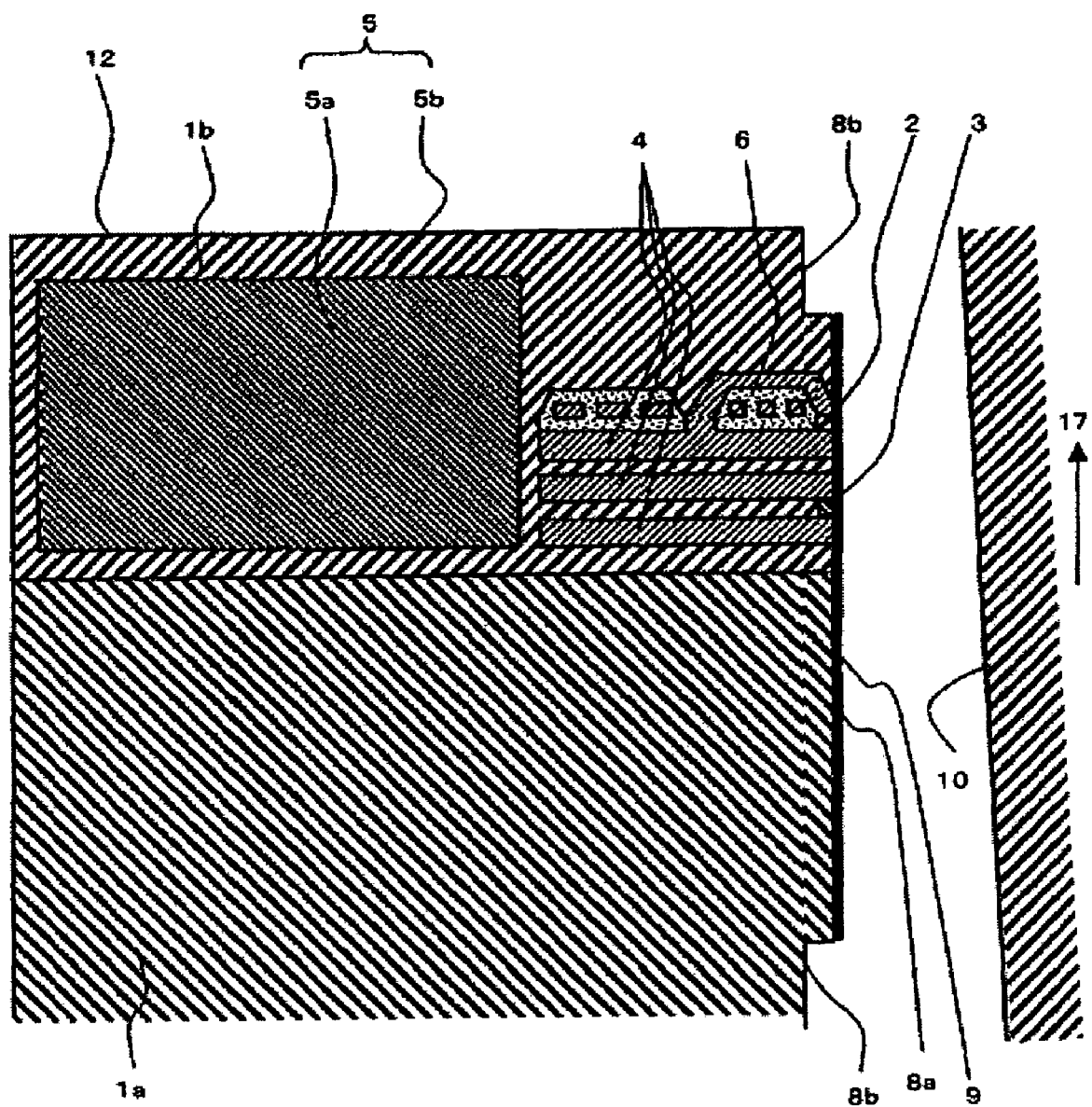
FIG. 8 is a partial sectional view of a magnetic head slider in a magnetic disk device of a second embodiment of the invention.

Next, a second embodiment of the invention is described using FIG. 8. FIG. 8 is a partial sectional view of a magnetic head slider of a magnetic disk device of the second embodiment of the invention. The second embodiment is different from the first embodiment in the following points, and essentially the same as the first embodiment in other points.

In the first embodiment, the alumina thin-film portion 5a was located outside, and the alumina thin-film portion 5a was exposed in the air-bearing surfaces 8b, 8c other than the air-bearing surface 8a added with the carbon film 9. On the contrary, in the second embodiment, the silica thin-film portion 5b is located outside, and the silica thin-film portion 5b is exposed in the air-bearing surfaces 8b, 8c. Again in the thin-film head structure of the second embodiment, the effect of reducing the thermal irregularity due to change of ambient temperature is obtained.

In loading where the magnetic head slider 1 and the suspension, which have escaped on the ramp 14, move from the ramp onto the magnetic disk 10 to start air-flying, a corner of the magnetic head slider 1 sometimes strikes the magnetic disk 10 and marks it. Since silica has low hardness compared with alumina, damage to the disk may be reduced in loading and the like in the second embodiment. Contrarily, damage to the slider itself may be reduced in the first embodiment.

Figure 9:
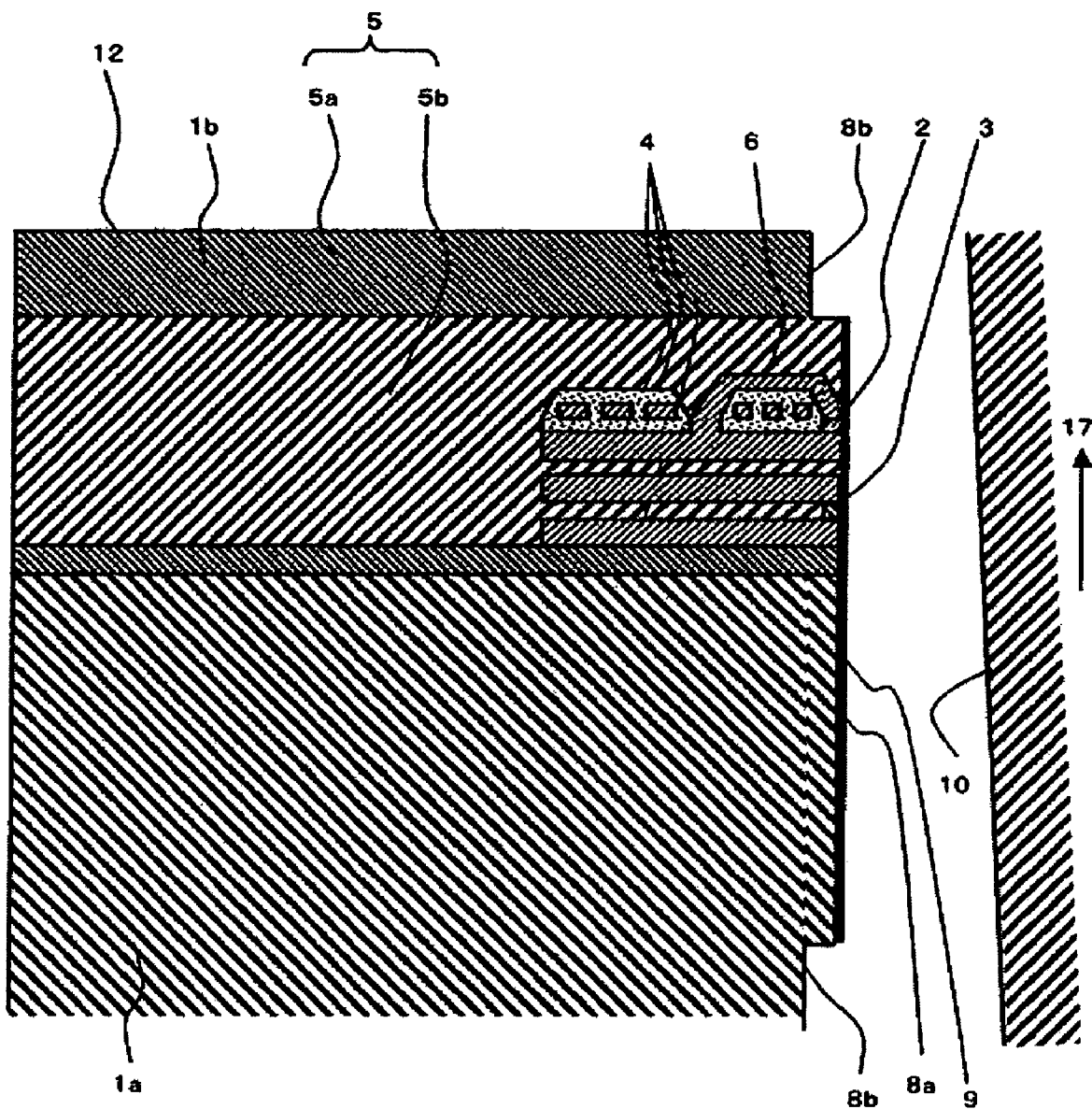
FIG. 9 is a partial sectional view of a magnetic head slider in a magnetic disk device of a third embodiment of the invention.
Figure 10:
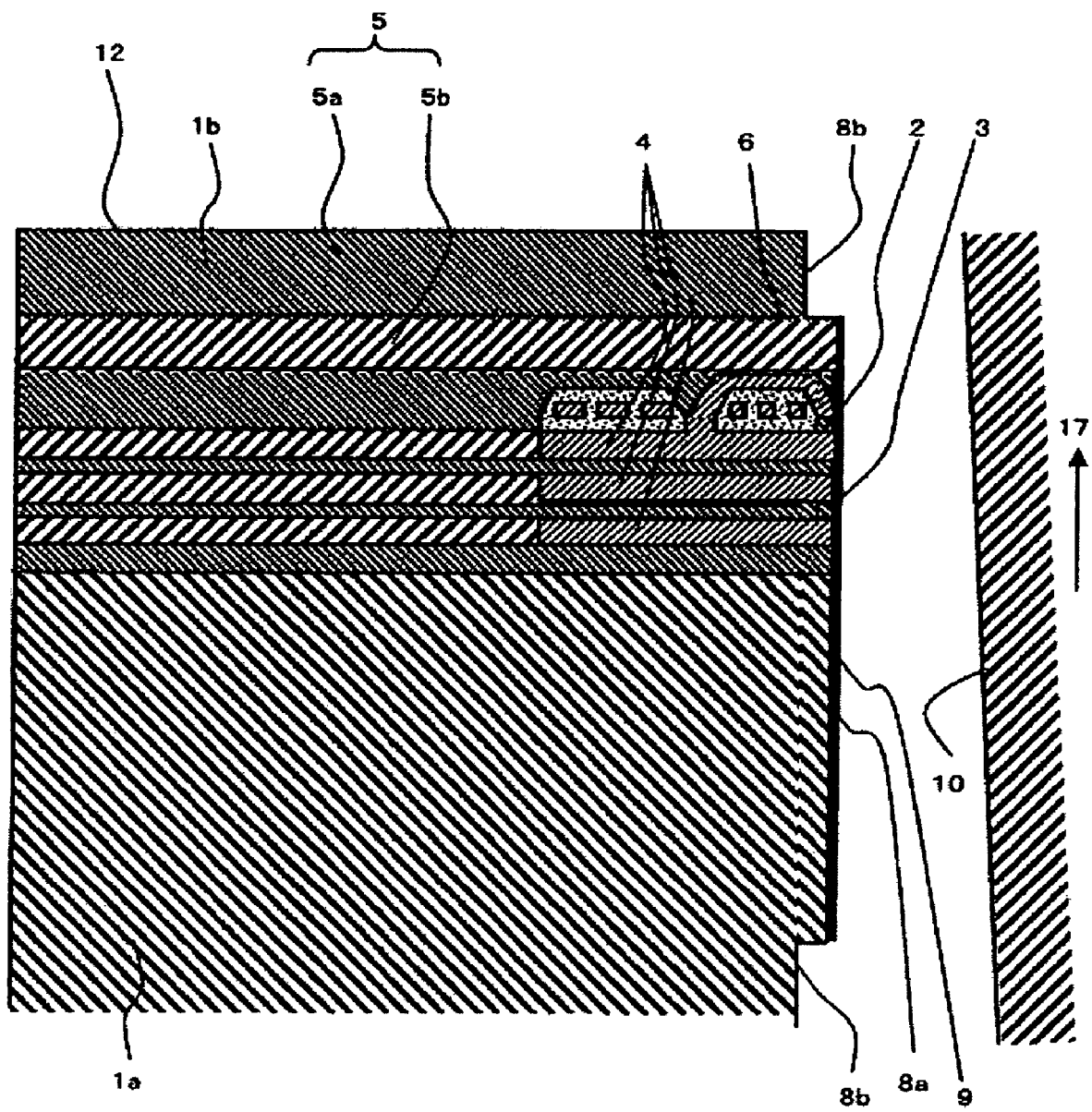
FIG. 10 is a partial sectional view of a modification of the magnetic head slider of the third embodiment.

Next, a third embodiment of the invention is described using FIG. 9 and FIG. 10. FIG. 9 is a partial sectional view of a magnetic head slider of a magnetic disk device of the third embodiment of the invention, and FIG. 10 is a partial sectional view of a modification of the magnetic disk device of the third embodiment. The third embodiment is different from the first embodiment in the following points, and essentially same as the first embodiment in other points.

In the third embodiment, the alumina thin-film portion 5a and the silica thin-film portion 5b are used properly in a layer direction along which thin films forming the thin-film head portion 1b are sequentially formed. In the magnetic head slider 1 shown in FIG. 9, the alumina thin-film portion 5a is formed on both sides of the silica thin-film portion 5b. The silica thin-film portion 5b is formed on a layer including the metal film 4 and the recording/reproduction elements 2, 3. In the magnetic head slider 1 shown in FIG. 10, the silica thin-film portion 5b is formed in the same layers as top and bottom shields of the reproduction element 3, in the same layer as a lower magnetic-pole of the recording element 2, and formed above an upper magnetic pole of the element 2, respectively.

Again in the thin-film head structure of the third embodiment, the effect of reducing the thermal irregularity due to a change of ambient temperature can be obtained. Again in this case, it is better that the volume ratio of the alumina thin-film portion 5a is 15% to 50%. These are merely examples, and even if another layer is formed as the silica thin-film portion with the volume ratio being kept, the advantages of the invention can be obtained.

Next, a fourth embodiment of the invention is described. In the fourth embodiment, a mixed thin-film portion of alumina with silicon-based ceramics is used instead of the silica thin-film portion 5b shown in FIG. 3 and FIG. 7 to FIG. 10. A mixed sputtering thin-film of alumina with silica can be used for the mixed thin-film portion. Alternatively, silicon carbide, silicon nitride, or a mixed sputtering thin-film of those with alumina may be used. In the fourth embodiment, since the coefficient of linear expansion of the mixed thin-film portion 5b is large compared with the first to third embodiments having the thin-film portion 5b formed from silica, the effect of suppressing the projection is restrictive; however, it is still effective compared with the case of alumina of 100%.

Next, a fifth embodiment of the invention is described. In the fifth embodiment, a thin-film portion of alumina mixed with silicon-based ceramics is used instead of the silica thin-film portion 5b in the structure shown in FIG. 5. A sputtering thin-film of alumina mixed with silica is used for the mixed thin-film portion. That is, the coefficient of the linear expansion similar to that of the silicon substrate portion 1a is realized using alumina and silica in a condition that they are not separated into different parts and mixedly formed into a uniform film. Silicon carbide, silicon nitride, or a sputtering thin-film of alumina mixed therewith may be used.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk device having:
a magnetic disk arranged rotatably;
a magnetic head slider arranged in a manner of facing a surface of the magnetic disk; and
a driving unit configured to move the magnetic head slider in a radial direction of the surface of the magnetic disk,
wherein recording/reproduction is performed in a condition that an air stream is generated between the magnetic disk that is rotating and the magnetic head slider, to cause the magnetic head slider to fly,
wherein the magnetic head slider has a silicon slider-substrate-portion and a thin-film head portion which is formed directly on the slider substrate portion using a thin-film process and forms an air-bearing surface along with the slider substrate portion, and
wherein the thin-film head portion has a recording/reproduction element facing the surface of the magnetic disk and a ceramic insulation film which has alumina and silicon-based ceramics in order to have the approximately same coefficient of linear expansion as a coefficient of linear expansion of the silicon-slider-substrate portion
wherein the silicon-based ceramics of the ceramic insulation film are formed in the in-plane direction behind the recording/reproduction element
wherein the alumina ceramic completely encapsulates the silicon-based ceramic.

2. A magnetic disk device having:
a magnetic disk arranged rotatably;
a magnetic head slider arranged in a manner of facing a surface of the magnetic disk; and
a driving unit configured to move the magnetic head slider in a radial direction of the surface of the magnetic disk,
wherein recording/reproduction is performed in a condition that an air stream is generated between the magnetic disk that is rotating the magnetic head slider, to cause the magnetic head slider to fly,
wherein the magnetic head slider has a silicon slider-substrate-portion and a thin-film head portion which is formed on the slider substrate portion using a thin-film process and forms an air-bearing surface along with the slider substrate portion,
wherein the thin-film head portion has a recording/reproduction element facing the surface of the magnetic disk and a ceramic insulation film protecting the recording/reproduction element, and
wherein the ceramic insulation film comprises a thin-film portion formed from alumina and another thin-film portion formed from silicon-based ceramics and formed in the in-plane direction behind the recording/reproduction element
wherein the alumina ceramic completely encapsulates the silicon-based ceramic.

3. The magnetic disk device according to claim 2, wherein the thin-film portion formed from silicon-based ceramics comprises any one of a thin-film portion formed from silica, thin-film portion formed using silicon carbide, or thin-film portion formed from silicon nitride.

4. The magnetic disk device according to claim 3, wherein, in the ceramic insulation film near the recording/reproduction element, the thin-film portion formed from alumina is about 15% to 50% in volume, and the remainder of the insulation film is the thin-film portion formed from silicon-based ceramic.

5. The magnetic disk device according to claim 2 wherein, in the thin-film portion formed from silicon-based ceramics, which has a metal film forming the recording/reproduction element, a ratio of the thin-film portion formed from alumina as a portion distant from the metal film is large compared with a portion near the metal film.

6. A magnetic head slider which generates an air stream between the slider and a rotating magnetic-disk and performs recording/reproduction while flying from a surface of a magnetic disk,
wherein a silicon slider-substrate-portion and a thin-film head portion which is formed on the slider-substrateportion using a thin-film process and forms an air-bearing surface along with the slider substrate portion are provided, and wherein and the thin-film head portion has a recording/reproduction element facing the surface of the magnetic disk, and a ceramic insulation film which is formed from alumina and silicon-based ceramics and has approximately the same coefficient of linear expansion as a coefficient of linear expansion of the silicon slider-substrate-portion wherein the alumina ceramic completely encapsulates the silicon-based ceramic.

* * * * *